UNITED STATES PATENT OFFICE.

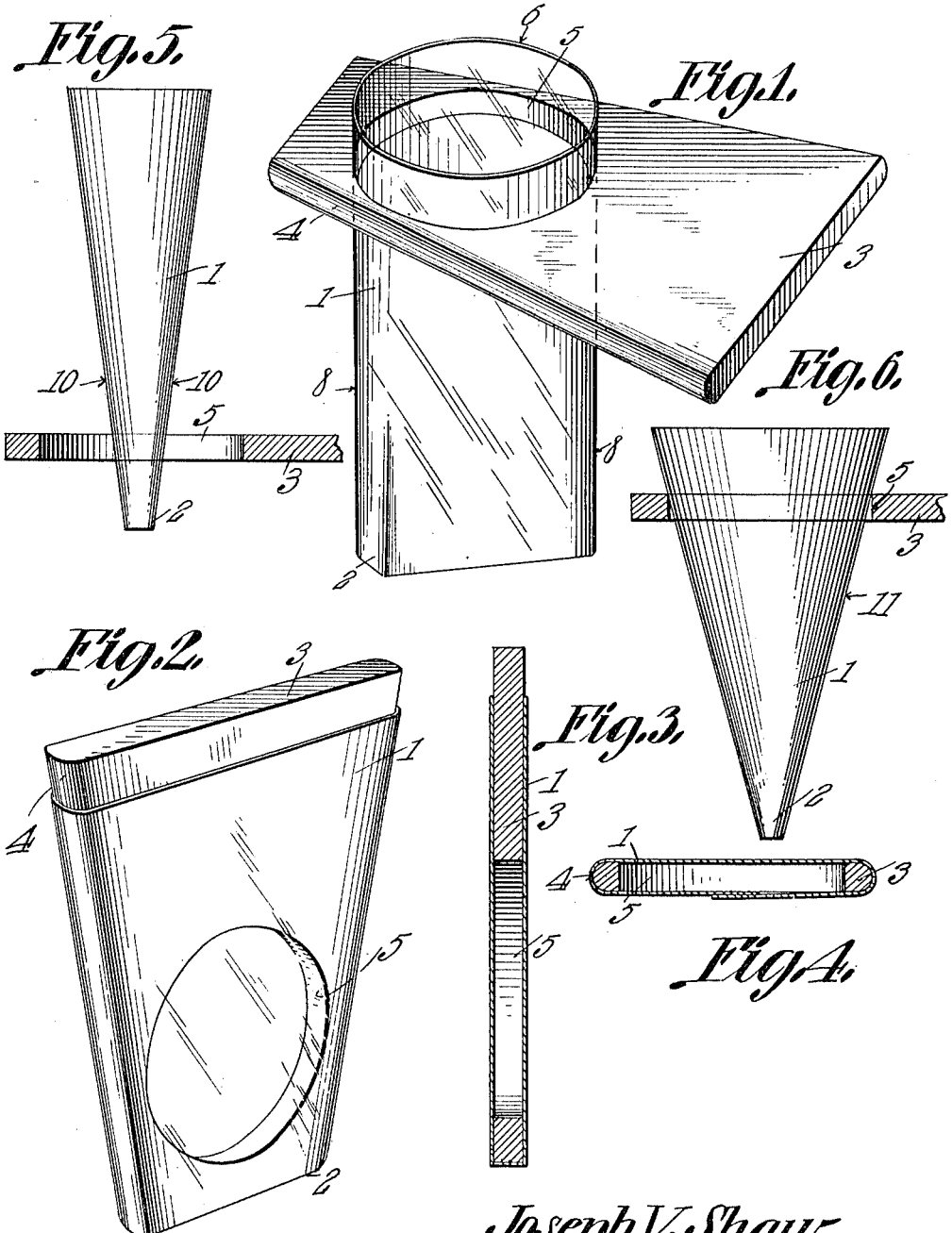

JOSEPH V. SHAW, OF DENVER, COLORADO.

SANITARY FOLDING CUP.

1,079,067.  Specification of Letters Patent.  Patented Nov. 18, 1913.

Application filed February 17, 1913. Serial No. 748,977.

*To all whom it may concern:*

Be it known that I, JOSEPH V. SHAW, a citizen of the United States, residing at Denver, in the county of Denver and State of Colorado, have invented a new and useful Sanitary Folding Cup, of which the following is a specification.

One object of the present invention is to provide a folding cup for travelers and others, which may be carried readily in the pocket.

Another object of the invention is to provide a folding cup having a spreader adapted to be used as a handle.

Another object of the invention is to provide a folding cup having a spreader which is adapted to serve as a handle for the cup, the construction being such that as the cup is inserted into the spreader, when the spreader is used as a handle, the capacity of the cup will be varied.

Another object of the invention is to provide a cup of the type described provided with a spreader which is adapted to serve as a float for the cup.

It is within the scope of the invention to improve generally, and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings:—Figure 1 shows the invention in perspective, the spreader being removed from the cup and being employed as a handle for the cup; Fig. 2 is a perspective showing the spreader in place within the cup; Fig. 3 is a longitudinal section of the spreader and the cup; Fig. 4 is a transverse section of the spreader and the cup; Fig. 5 is a sectional detail showing the cup partially inserted into the spreader; and Fig. 6 is a detail showing the cup inserted into the spreader to the limit.

In carrying out the invention there is provided a cup 1 which may be fashioned from any desired yieldable material. Preferably, although not necessarily the cup is made of celluloid. The cup 1 is of approximately conical form, the smaller end 2 of the cup approximating a rectangle of unequal dimensions.

Mounted within the cup 1 is a spreader 3. The spreader 3 may be constructed from any desired material or composition of materials. It is desirable, in some instances, that the spreader 3 be fashioned from wood or from some other buoyant material. The spreader 3 is approximately wedge shaped, the converging edges 4 of the spreader being rounded transversely so as to prevent a cracking of the cup 1 when the spreader is inserted into the cup. The spreader 3 is provided at a point relatively near to its smaller end with an opening 5 which is of circular contour.

When the structure is carried in the pocket or is not in use, the parts appear as shown in Fig. 2, the spreader 3 being inserted into the cup 1. The spreader 3 is somewhat longer than the cup 1 so that the upper end of the spreader may protrude beyond the upper end of the cup, thereby affording a hand-hold whereby the cup and the spreader may be separated. The spreader 3 may be withdrawn from the cup 1, and the smaller end of the cup 1 may be inserted into the opening 5 in the spreader, the parts appearing then as shown in Fig. 1. Under such circumstances, the spreader 3 becomes a handle whereby the cup 1 may be inserted into a liquid. Owing to the fact that the opening 5 in the spreader 3 is of circular contour, the cup 1 when inserted into the opening 5, will, at its upper edge, assume a circular outline as indicated at 6 in Fig. 1.

It is possible to vary the capacity of the cup 1 depending upon the extent to which the cup 1 is thrust into the opening 5. When the cup 1 is thrust into the opening 5, the converging edges of the cup will lie in parallel relation as indicated at 8 in Fig. 1. The side walls of the cup, however, will bulge outwardly, and assume a slant, as indicated in Fig. 6. When the cup 1 is but partially inserted into the opening 5 in the spreader 3, as indicated at Fig. 5, the slant indicated at 10 will more closely approach parallelism, than when the cup 1 is inserted to the limit in the opening 5, as indicated in Fig. 6, it being observed that the slant 11 in Fig. 6 is more pronounced than the slant 10 in Fig. 5. By the operation above described, the capacity of the cup 1 may be varied, depending upon the extent to which the cup is inserted in the opening 5 in the spreader. Owing to the fact that the opening 5 is circular, the cup 1 will be peripherally supported, when the cup is inserted into the opening 5 in the spreader, and the extent of the support thus given to the cup will increase as the cup is thrust farther and farther into the opening 5. Consequently, as the cup is extended, to contain more liquid, the support given to the cup will be increased, and a distortion of the cup by the weight of the liquid, together with a downward sliding of the cup in the opening 5, due to the weight of the liquid will be avoided.

It has been stated hereinbefore that the spreader 3 may be fashioned from buoyant material. Under such circumstances, when the parts are positioned as shown in Fig. 1, the cup 1, partially filled with liquid may be permitted to float upon the surface of the liquid contained in an ice water tank or like structure, it being thus possible to cool the contents of the cup 1, without commingling the contents of the cup with the contents of the cooler.

Having thus described the invention, what is claimed is:—

1. In a device of the class described, a yieldable conical cup; and a wedge shaped spreader in the cup, the spreader having an opening adapted to receive the smaller end of the cup and permit the spreader to be used as a handle for the cup.

2. In a device of the class described, a yieldable conical cup; and a wedge shaped spreader in the cup; the spreader having an opening adapted to receive the smaller end of the cup and to permit the spreader to be used as a handle for the cup; the opening constituting a means for varying the slant of the side wall of the cup, thereby to vary the capacity of the cup as the cup is thrust into the opening, and the opening being of circular form, to increase the support given to the cup, as the cup is thrust into the opening.

3. In a device of the class described, a yieldable conical cup; and a wedge shaped spreader in the cup; the spreader having an opening adapted to receive the smaller end of the cup and to permit the spreader to be used as a handle for the cup; the spreader being fashioned from buoyant material, whereby when the spreader is positioned for use as a handle, the spreader will constitute also, a float, adapted to support the cup.

In testimony that I claim the foregoing as my own, I have hereto affixed my signature in the presence of two witnesses.

JOSEPH V. SHAW.

Witnesses:
J. M. SHAW,
W. F. SHAW.

Copies of this patent may be obtained for five cents each, by addressing the "Commissioner of Patents, Washington, D. C."